United States Patent [19]
Kolb

[11] 3,896,674
[45] July 29, 1975

[54] SENSOR PROBE CONTROL SYSTEM

[75] Inventor: William A. Kolb, Forest Hills, Pa.

[73] Assignee: United States Steel Corporation, Pittsburgh, Pa.

[22] Filed: Mar. 1, 1973

[21] Appl. No.: 337,250

[52] U.S. Cl.............. 73/432 R; 73/343.5; 73/359; 266/34 LM; 346/33 TP
[51] Int. Cl.......................... G01k 1/14; G01k 7/02
[58] Field of Search.......... 73/432 R, 359, 321, 312, 73/343.5, 17 R; 33/126.6; 318/482; 266/34 L, 34 LM; 236/94; 137/392; 346/33 TP

[56] References Cited
UNITED STATES PATENTS

| | | | |
|---|---|---|---|
| 2,377,288 | 5/1945 | Wiggins | 73/321 |
| 2,657,577 | 11/1953 | Falk | 73/312 X |
| 3,610,601 | 10/1971 | Bishop, Jr. | 73/359 |
| 3,672,222 | 6/1972 | Stelts et al. | 266/34 LM X |
| 3,717,034 | 2/1973 | Dukelow et al. | 73/343 R |

Primary Examiner—Jerry W. Myracle
Assistant Examiner—Daniel M. Yasich
Attorney, Agent, or Firm—David S. Urey

[57] ABSTRACT

Apparatus for automatically controlling a bath sensing operation in a steelmaking process is disclosed. A sensor, housed within a probe, is movable in relation to the probe. A first mechanism is connected to the probe to move it relative to a vessel. A second mechanism is connected to the sensor to move it relative to the probe. An automatic control circuit prevents the sensing operation from commencing unless good electrical contact is made between the sensor and recorders and a flow of protective gas is established about the sensor. If these two conditions are satisfied, the automatic control circuit causes the first mechanism to lower the probe to a predetermined depth within the vessel, and then allows the second mechanism to extend the sensor from the probe to a predetermined depth within the bath. After bath parameters such as oxygen content, temperature, and carbon content have been sensed and recorded, or after a maximum duration of time, whichever occurs first, the control circuit reverses the operation of the first and second mechanisms to retract the sensor into the probe and withdraw the probe from the vessel.

29 Claims, 9 Drawing Figures

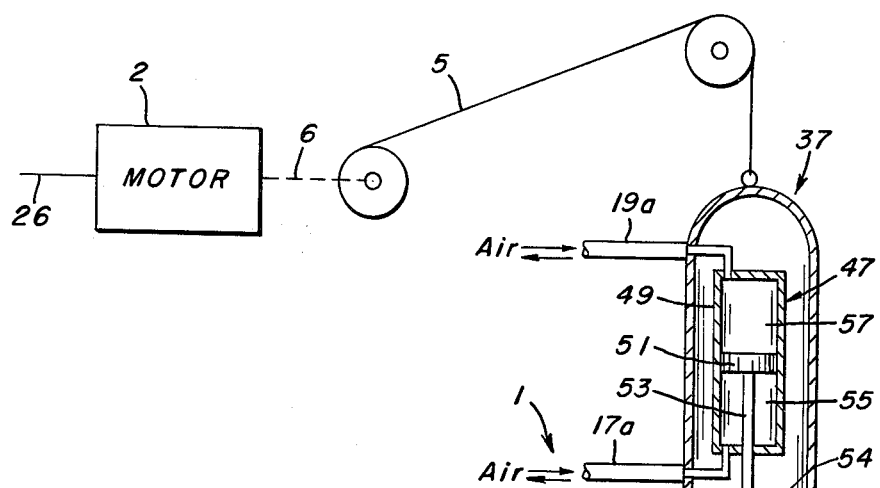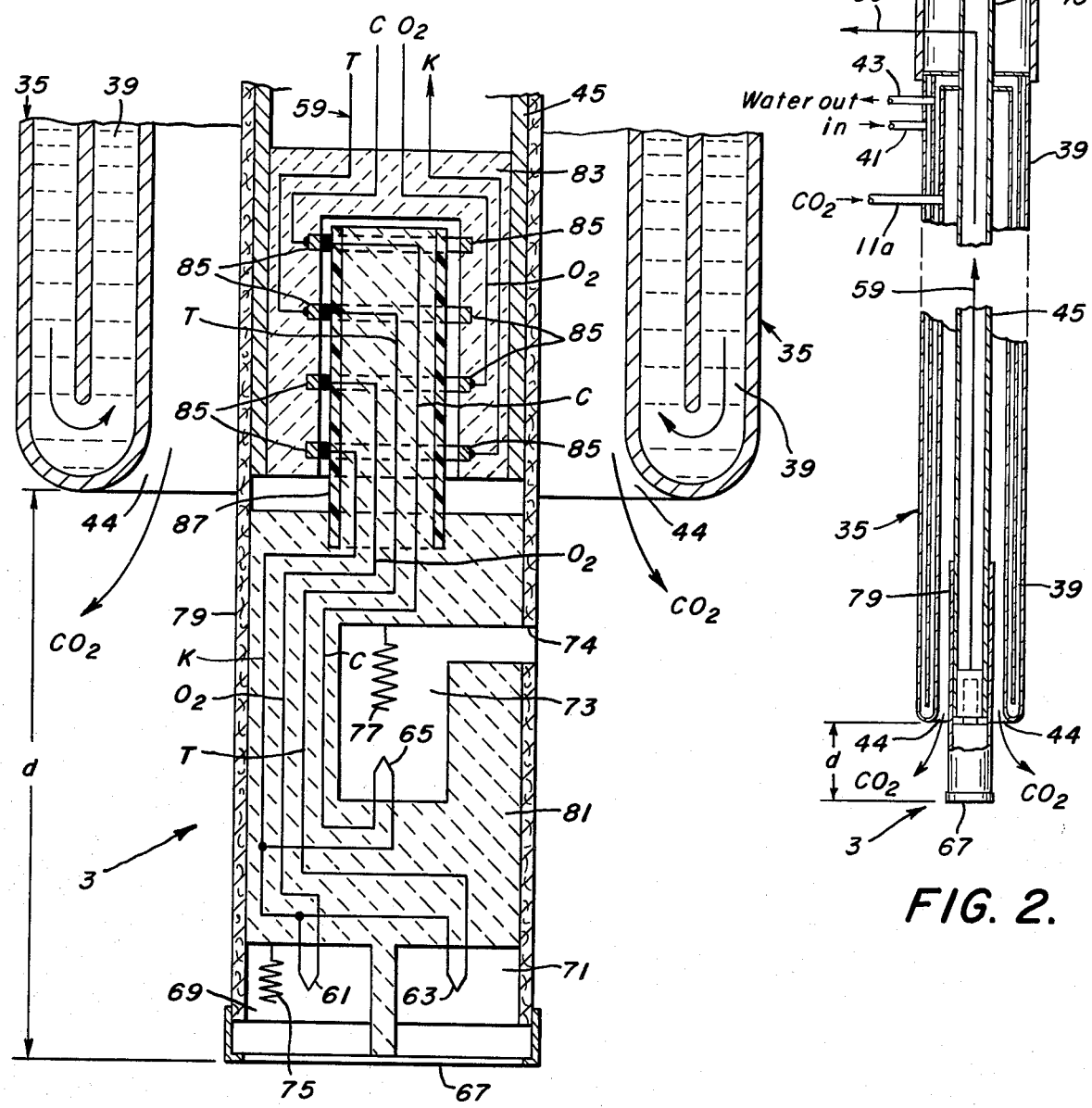
FIG. 3.
FIG. 2.

SENSOR PROBE CONTROL SYSTEM

BACKGROUND OF THE INVENTION

This invention relates to an apparatus for automatically controlling the movement of a sensor used in a steelmaking process and, in particular, to an apparatus for automatically lowering the sensor to a predetermined depth in a bath of liquid steel, maintaining the sensor in the bath until bath parameters are recorded or for a maximum period of time, whichever occurs first, and then raising the sensor out of the bath.

In the manufacture of steel by processes, such as the basic oxygen process (BOP), Q-BOP process or the like, a prime objective is the control of carbon content and oxygen content in the liquid steel and the temperature of such liquid steel so that the desired final chemical compositions and solidification structures can be realized. The amount of such carbon content may be determined by indirectly measuring the solidification temperature of the liquid steel. The indirect measurement of the dissolved oxygen content includes measuring the temperature of a sample of the steel or the like in the presence of certain alloys.

Measurement of parameters, such as oxygen content, temperature, and carbon content, may be made with the use of sensors. In a known technique, a probe, having a sensor which is initially positioned within and movable in relation to the probe, is lowered into a basic oxygen furnace containing the liquid steel bath. The probe is attached to a mechanical hoist or the like and is lowered into the furnace with the use of an air motor or the like, connected to the hoist, which hoist is manually controlled by an operator. A button is then pushed by the operator to extend the sensor from the probe and lower it into the bath. After a few seconds, when the operator has observed that the bath parameters have been sensed and recorded by a recording device electrically connected to the sensor, he again pushes a button to retract the sensor into the probe. The air motor is then reverse operated, thereby withdrawing the probe and sensor from the furnace.

There are several disadvantages in the above-described technique for sensing and measuring parameters of the liquid steel bath. First, such technique requires that an operator be stationed near the probe to manually control its movement and to observe its operation. Second, it is difficult for an operator to lower the probe to the exact, desired predetermined depth within the furnace by manually controlling the air motor. Third, due to manual operation, accurate control of the time during which the sensor remains in the liquid bath is difficult to obtain. If the sensor is maintained in the bath for too long a period, there may be difficulty in retracting it into the probe. If the sensor is left in the bath for too short a period, measurements may not be made. Fourth, the operator may lower the sensor into the bath even though there is a poor electrical connection between the sensor and the recording instruments, thereby possibly preventing measurement of the bath parameters. Finally, the probe may be lowered by the operator even if a carbon dioxide supply, which is used for keeping metal clear of the sensor, is not turned on.

OBJECTS OF THE INVENTION

The present invention has the advantage of providing a technique for reliably recording the parameters of a bath. Another advantage is the use of a control circuit that automatically controls the sensing operation. A further advantage is the use of an automatic control circuit that will prevent the sensing operation from commencing unless good electrical contact is made between the sensor and the recorder and a flow of sensor protecting gas is established.

SUMMARY OF THE INVENTION

In accordance with the present invention, a sensor, capable of sensing all of the desired bath parameters, is housed in a probe and is movable in relation to the probe. A first mechanism is connected to the probe to move it relative to a predetermined position within a vessel while a second mechanism, which is connected to the sensor, moves the sensor relative to the probe in order to extend it into a bath in the vessel. Electrically connected to the sensor is a recording instrument which records the desired bath parameters. A supply line extends through the probe to provide a supply of sensor protecting gas that is directed about the sensor. A complete cycle of operation, described below, is automatically controlled by a circuit that controls the supply of sensor protecting gas and the mechanisms which move the probe and sensor.

Initially, the probe is positioned at a predetermined height above the vessel with the sensor retracted in the probe. To start the operation, a single button in the control circuit is pushed. If good electrical contact between the sensor and recording instrument is detected, the control circuit enables a supply of sensor protecting gas to be fed through the supply line to be directed about the sensor. After detection by the control circuit of the flow of the sensor protecting gas, the control circuit enables the first mechanism to move the probe into the vessel. When the probe reaches a predetermined depth in the vessel, the control circuit causes the first mechanism to stop lowering the probe and enables the second mechanism to extend the sensor into the bath. The control circuit then allows the sensor to remain in the bath until recordings have been made, or for a maximum duration of time, whichever occurs first. Then, the two mechanisms are reverse operated to retract the sensor into the probe and withdraw the probe from the vessel.

BRIEF DESCRIPTION OF THE DRAWINGS

FIG. 2 is a fragmentary side elevational view, partially in section showing in more detail the probe and sensor used in FIG. 1;

FIG. 3 is an enlarged vertical sectional view showing in greater detail the sensor shown in the lower portion of FIG. 2;

DETAILED DESCRIPTION OF THE DRAWINGS

Apparatus A

Figure 1:
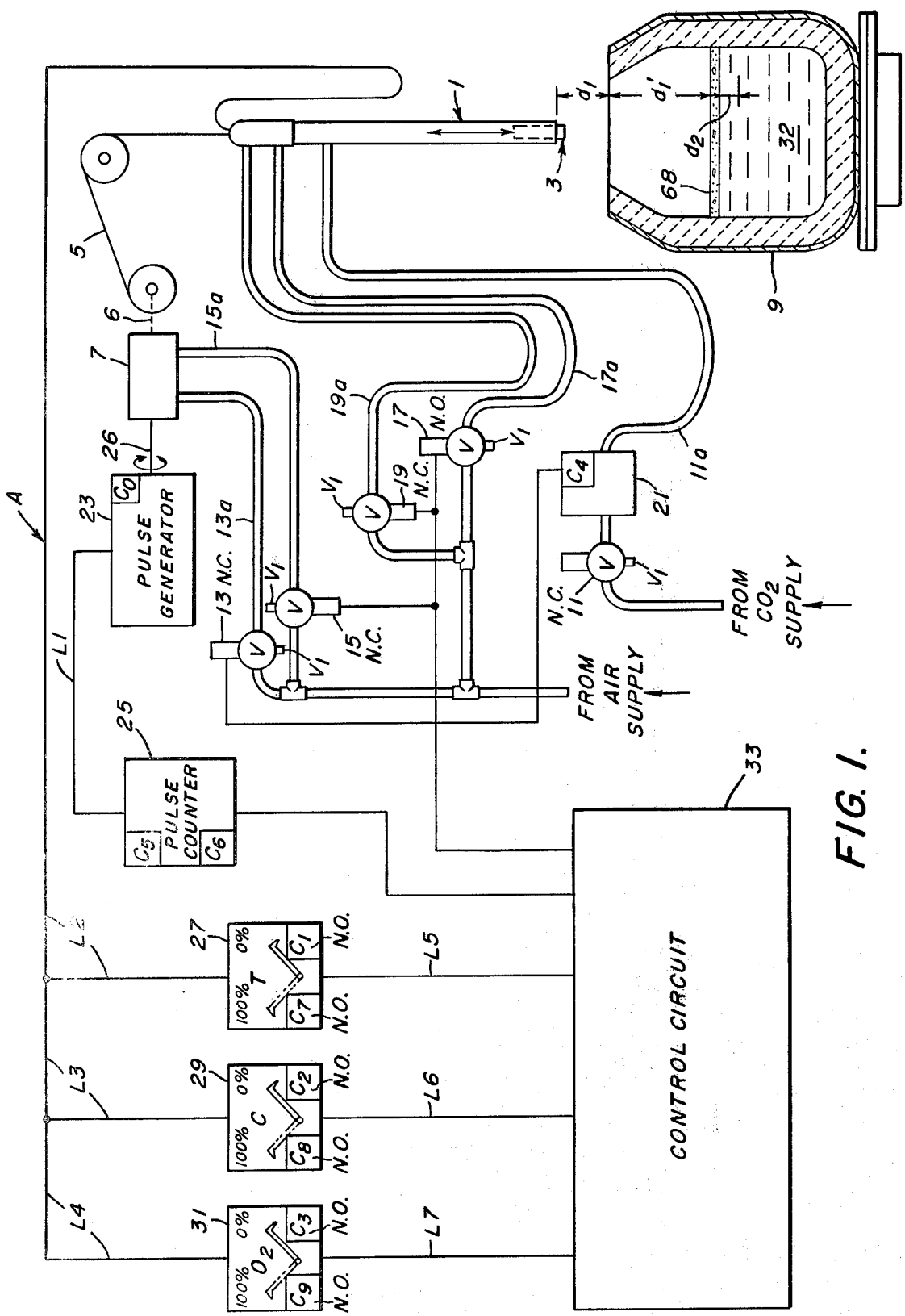
FIG. 1 is a schematic and block diagram of the sensing and automatic control apparatus of the present invention.

Referring to FIG. 1, apparatus A has a probe 1 (FIGS. 1, 2) having a sensor 3 (FIGS. 1-3) which sensor 3 is movable in relation to the probe 1 and is initially positioned within it. Connected to the top of probe 1 is a mechanical hoist 5 (FIGS. 1, 2) which hoist 5 is operated through shaft 6 (FIGS. 1, 2) by a reversible air motor 7 or the like. Reversible air motor 7 is used to lower the probe 1 and sensor 3 to a predetermined depth in a vessel 9 (FIG. 1), such as a basic oxygen furnace, Q-BOP furnace or the like.

A series of five solenoid control valves 11, 13, 15, 17, 19 (FIGS. 1, 4) are employed for enabling movement of the probe 1 and sensor 3 in relation to the vessel 9. Control valve 11 is connected via a supply line 11a (FIGS. 1, 2 to the probe 1 in order to supply a sensor protecting gas, such as carbon dioxide or the like, about the sensor 3. Control valves 13 and 15 are connected to the reversible air motor 7 via respective supply lines 13a and 15a (FIG. 1) to supply air to the air motor 7. Control valves 17 and 19 are connected via supply lines 17a and 19a (FIG. 1) to an air cylinder 47 (shown in FIG. 2) located in the probe 1 to enable movement of the sensor 3 in relation to the probe 1. A flow switch 21 (FIG. 1) in $CO_2$ supply line 11a is connected to control valve 13 to open valve 13 when $CO_2$ flow is established.

Connected to the reversible air motor 7 is a pulse generator 23 (FIG. 1) which generator 23 supplies pulses to a bi-directional pulse counter 25 (FIG. 1) via line L1 (FIG. 1). An example of a bi-directional pulse driven counter 25 which may be used in the present invention is Neuron Model 127 Series, manufactured by Electronic Resources, Inc., Los Angeles, California. Coupling of the pulse generator 23 to the motor 7 may occur through a rotating shaft 26 (FIG. 1) of the motor 7 which motor 7, for example, may close a contact $C_o$ (FIG. 1) on the pulse generator 23 every revolution. Pulse generator 23 may thereby generate a pulse with each closure of the contact $C_o$.

A series of recorders 27, 29, 31 are electrically connected by lines L2, L3, L4 (FIG. 1) to the sensor 3 (as hereinafter described) for recording the various parameters of the bath 32 (FIG. 1) in vessel 9. Examples of recorders 27, 29, 31 which may be used are the Series "E" recorders described in Catalog No. 6510 by the Esterline Angus Instrument Company, Indianapolis, Ind. The recorders 27, 29, 31 also include alarm indicators (not shown) but described on page 15 of the Esterline catalog, which indicate if there is good electrical contact between sensor 3 and the recorders. This is because the alarm indicators adjust the writing pen P of the recorders 27, 29, 31 to, for example, 0 percent of scale. If good electrical contact is made, the pen P will be at 0 percent of scale and contacts $C_1$, $C_2$, $C_3$ (shown in block in FIG. 1) of recorders 27, 29, 31 respectively will close to allow recordings to be made. If good electrical contact is not made, the pen P will be at other than 0 percent of scale and contacts $C_1$, $C_2$, $C_3$ will not close, thereby preventing recordings from being made.

General Operation of Control Circuit 33

A control circuit 33 (FIGS. 1, 4) for automatically controlling the movement of the probe 1 and sensor 3 is connected to the apparatus A of FIG. 1, by the lines L5, L6, L7 which represent electrical connections. As will be more fully described below, it is the function of the control circuit 33 to prevent the sensing operation from commencing unless: (1) good electrical contact is made between the sensor 3 and recorders 27, 29, 31; and (2) a flow of $CO_2$ or the like is established through supply line 11a. Then, if good electrical contact is made and $CO_2$ flow is established, the control circuit 33 functions to automatically lower the probe 1 to a predetermined depth into the vessel 9, move the sensor 3 relative to the probe 1 into the bath, maintain the sensor 3 in the bath until parameter measurements have been recorded or for a maximum period of time, whichever occurs first, and then retract the sensor 3 into the probe 1 and withdraw the probe 1 from the vessel 9.

Probe 1

Referring to FIG. 2, there is shown, in more detail, the probe 1 and sensor 3. The probe 1 comprises a cylindrical lower housing 35 (FIGS. 2, 3) connected to a cylindrical upper housing 37 (FIG. 2). Lower housing 35 has water cooling conduits 39 (FIGS. 2, 3) for the sensor 3 and has a water input line 41 and water output line 43 (FIG. 2). In addition, apertures 44 (FIGS. 2, 3) are provided in the lower housing 35 to enable $CO_2$ supply line 11a to direct $CO_2$ through the housing apertures 44 to supply $CO_2$ about sensor 3.

Sensor 3

The sensor 3 is located within the cylindrical lower housing 35 near the bottom thereof and is held by a sensor holder 45 (FIGS. 2, 3). Holder 45 extends from the sensor 3 through lower housing 35 into upper housing 37 where it is connected to the air cylinder 47. Air cylinder 47 comprises a casing 49 (FIG. 2), a piston 51 and piston rod 53 connected at 54 to holder 45. The air cylinder 47 may be rigidly attached to housing 37 in any known conventional manner. Connected to the air cylinder 47 are the air supply lines 17a and 19a which extend, respectively, through the housing 37 to the lower compartment 55 (FIG. 2) and upper compartment 57 of the air cylinder 47. In addition, a 4-conductor electrical cable 59 connects the sensor 3 through line L2 to the several recorders 27, 29, 31 shown in FIG. 1.

Referring to FIG. 3, there is shown in still further detail the sensor 3, extended a small distance $d$ (FIGS. 2, 3) from probe 1 and water cooling conduits 39. The sensor 3 comprises three thermocouples 61, 63 and 65 (FIG. 3) which thermocouples 61, 63, 65 may be used to sense, respectively, total oxygen content, temperature, and carbon content of the bath 32. A protective cap 67 (FIGS. 2, 3), which burns off when the sensor 3 is lowered into the liquid steel bath 32, surrounds the bottom of the sensor 3 in order to protect it against slag 68 (FIG. 1) floating at the top of the bath 32. The three thermocouples 61, 63, 65 are positioned within respective compartments 69, 71, 73 (FIG. 3) into which bath samples flow for purposes of obtaining measurements of the parameters. Within compartment 69 is an alloy material 75 (FIG. 3) which material 75 is used to determine the total oxygen content of the sample while compartment 73 contains an aluminum wire 77 (FIG. 3), which wire 77 is used as a kilning metal in order to determine the bath carbon content when the bath 32 enters compartment 73 via port 74. The use of the sensing elements including the alloy material 75 and kilning metal 77 are well-known in the art.

A cardboard sleeve 79 (FIGS. 2, 3) encases the sensor 3 and part of sensor holder 45, and houses a heat and electrical insulator 81, such as a ceramic or the like. The sensor holder 45 encloses an electrical insulator 83 (FIG. 3), such as Micarta or the like. Within the Micarta insulation 83 are a series of copper or brass slip rings 85 (FIG. 3), which rings 85 are connected to the several recorders 27, 29, 31 via the respective wires T, C, $O_2$ and a fourth wire K (common). These four wires comprise the 4-conductor electrical cable 59.

In order to connect the thermocouples 61, 63, 65 to the respective copper or brass slip rings 85, the wires from each thermocouple 61, 63, 65 are fed from the tips of the thermocouples 61, 63, 65 through the ceramic insulator 81 (FIG. 3) and a Teflon insulator 87 (FIG. 3) to the slip rings 85. The wires, T, C, $O_2$, K from the several thermocouples 61, 63, 65 may be connected to the slip rings 85 by a friction fit.

Operation

Figure 4:
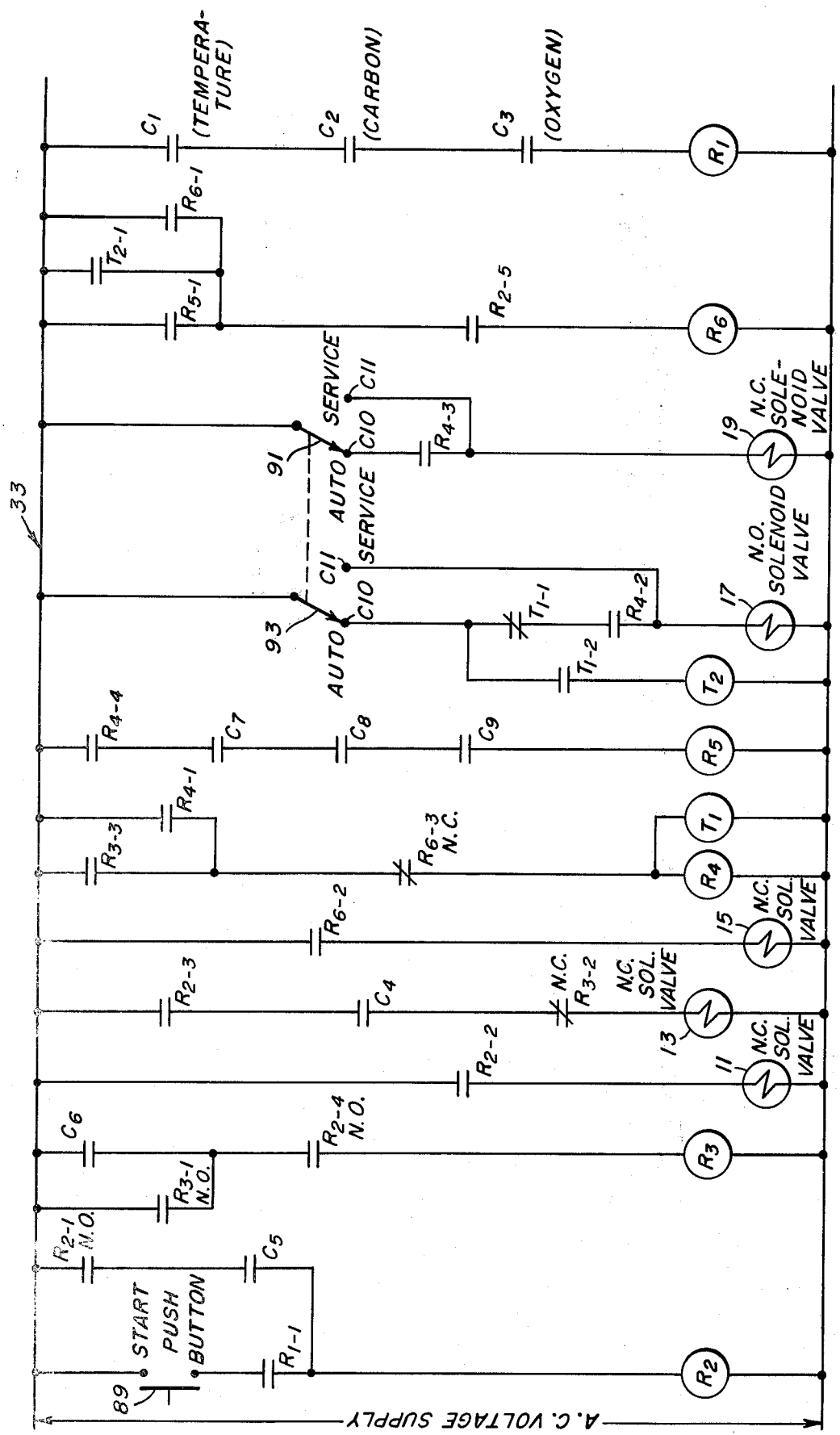
FIG. 4 is a schematic diagram of the control circuit of the present invention.

The operation of the present invention will now be described in connection with the schematic drawing of FIG. 4. Initially, the probe 1 is positioned a predetermined distance $d_1$ (FIG. 1) above the vessel 9 with the sensor 3 retracted within the probe 1. Also, the several contact switches of the several relays and timers are normally open or closed, as shown in FIG. 4. A normally open contact of a relay or timer shall be defined as a contact which is open when the relay or timer is de-energized and is illustrated by two parallel spaced lines. A normally closed contact is one which is closed when the relay or timer is de-energized and is illustrated by two parallel spaced lines with a diagonal line through the parallel lines. Each relay or timer shall be designated by an appropriate letter and a subscript to identify them. Each contact of the relay or timer will be identified by the relay or timer designation followed by a number unique to that contact. In addition, when solenoid valves 11, 13, 15, 19 receive no electric power, they are closed to the passage of air while solenoid valve 17 is opened to the passage of air when no power is received. Further, soldnoid valves 13, 15, 17, 19 are capable, when closed, of venting air via vents $V_1$ (FIG. 1) from their respective supply lines 13a, 15a, 17a, 19a. Such solenoid valves are well-known in the art.

When it is desired to record the oxygen, carbon and temperature parameters of the bath 32, an operator pushes a start button 89 (FIG. 4) and holds it in a few seconds for the reasons given below. If good electrical contact is made between the sensor 3 and the recorders 27, 29, 31 (FIG. 1) due to a good friction fit between the thermocouple wires T, C, $O_2$, K (FIG. 3) and slip rings 85, the recorder writing pens P will be at 0 percent scale and contacts $C_1$, $C_2$, $C_3$ of the recorders 27, 29, 31, respectively, will close, as mentioned previously. Relay $R_1$ (FIG. 4) will then energize to close contact $R_{1-1}$. With button 89 still being depressed, holding relay $R_2$ then will be energized to close seal-in or holding contact $R_{2-1}$ and contacts $R_{2-2}$ through $R_{2-5}$. The closure of contact $R_{2-2}$ energizes solenoid valve 11 to open it and enable carbon dioxide to flow via supply line 11a to the probe 1. When the carbon dioxide is established, switch 21 (FIG. 1) is energized and closes $CO_2$ flow switch contact $C_4$, which contact $C_4$ is physically located at flow switch 21 (FIG. 1). The closure of flow switch contact $C_4$ and contact $R_{2-3}$ (FIG. 4) energizes (probe lowering) solenoid valve 13 (FIGS. 1, 4) causing it to open, thereby enabling air to flow via supply line 13a (FIG. 1) to the reversible air motor 7. Since (probe raising) solenoid valve 15 is closed and vents air through vent $V_1$ from line 15a, the air motor 7 begins to lower probe 1 into the vessel 9.

As the air motor 7 lowers the probe 1, pulse generator 23 (FIG. 1) is enabled, in the manner mentioned above, to provide a series of pulses which are counted by pulse counter 25. When counter 25 (FIG. 1) begins its count, contact $C_5$ (FIGS. 1, 4) which contact $C_5$ is open at the zero count, closes and contact $C_6$ (FIGS. 1, 4), which contact $C_6$ is open when the count is begun, remains open. These contacts $C_5$, $C_6$ are physically located on the counter 25 (FIG. 1). The operator may then release button 89 since relay $R_2$ is sealed in via holding contact $R_{2-1}$ when contact $C_5$ closes.

When a predetermined pulse count by counter 25 (FIG. 1) is reached, contact $C_6$ (FIGS. 1, 4) closes and, due also to the previous closure of contact $R_{2-4}$, relay $R_3$ (FIG. 4) becomes energized. Relay $R_3$ closes seal-in or holding contact $R_{3-1}$ and opens contact $R_{3-2}$, thereby de-energizing (probe lowering) solenoid valve 13. As a result, the air supply to the air motor 7 via supply line 13a is cut-off and the lowering of the probe 1 is stopped. Thus, by making the depth to which the probe 1 is lowered a function of the count by counter 25, the probe 1 may be automatically lowered into the vessel 9 to a predetermined depth $d_1'$ (FIG. 1).

Relay $R_3$ also closes contact $R_{3-3}$, thereby energizing relay $R_4$ (FIG. 4) and stroke timer $T_1$. Stroke timer $T_1$ may be any known time delay, pick-up relay or the like, which timer $T_1$ does not change the state of its contacts until a pre-set period of time after it is energized. As will become apparent, stroke timer $T_1$ functions to extend the sensor 3 to a predetermined depth $d_2$ in the bath 32 as determined by the pre-set time on timer $T_1$.

Relay $R_4$ (FIG. 4) closes seal-in or holding contact $R_{4-1}$. In addition, relay $R_4$ closes contact $R_{4-2}$ thus energizing and closing (sensor raising) solenoid valve 17 since contact $T_{1-1}$ is closed at this time. Solenoid valve 19 is also energized and opened via the closure of contact $R_{4-3}$. As a result, air is supplied over line 19a to upper compartment 57 (FIG. 1) of cylinder 47 while air is vented from lower compartment 55 through line 17. Thus, the sensor 3 commences extending from the probe 1 into the bath 32.

After a period of time pre-set in stroke timer $T_1$, contact $T_{1-1}$ opens and contact $T_{1-2}$ closes. (Sensor raising) solenoid valve 17 is de-energized and opened when contact $T_{1-1}$ opens, thereby stopping the venting of air and allowing an air supply to be delivered to lower compartment 55. Thus, movement of the sensor 3 from the probe 1 ceases at a predetermined depth $d_2$ (FIG. 1) within the bath 32 as determined by stroke timer $T_1$. The closure of contact $T_{1-2}$ picks up dwell timer $T_2$ which, as will be described, functions to allow the sensor 3 to dwell in the bath for a maximum period of time. Dwell timer $T_2$ may also be a time delay, pick-up relay or the like, such as timer $T_1$.

Of course, it may be noted at this time that the initial position of probe 1 above the vessel 9 and the level of the bath 32 may vary from one sensing operation to another. Such variation may be readily accounted for by changing the pre-set count of counter 25 and the pre-set time of stroke timer $T_1$.

As mentioned previously, the present invention allows the sensor 3 to remain in the bath until recordings have been made, or for a maximum duration of time, whichever occurs first. While the sensor 3 is in the bath, recordings will be made by recorders 27, 29, 31.

After a few seconds the tips of the thermocouples 61, 63, 65 will burn up (indicating that recordings have been completed), thereby opening the circuit connecting the thermocouples 61, 63, 65 to the recorders 27, 29, 31. The opening of the circuit will drive the writing pens P on the recorders 27, 29, 31 to 100 percent of scale thereby closing a set of normally open contacts $C_7$, $C_8$, $C_9$ (FIGS. 1, 4) on the alarm indicators for the recorders 27, 29, 31 (see FIG. 1).

The closure of contacts $C_7$, $C_8$, $C_9$, (FIGS. 1, 4) together with the closure of contact $R_{4-4}$, will energize relay $R_5$ (FIG. 4). Relay $R_5$ will then close contact $R_{5-1}$ which, with contact $R_{2-5}$ being previously closed, will pick-up relay $R_6$. Relay $R_6$ closes seal-in or holding contact $R_{6-1}$ and contact $R_{6-2}$ while opening contact $R_{6-3}$. (Probe raising) solenoid valve 15 is energized and an air supply will be delivered over line 15a to withdraw the probe 1 from the vessel 9 since (probe lowering) solenoid valve 13 will be closed to vent air via vent $V_1$ from line 13a.

Relay $R_4$ (FIG. 4) will also be de-energized due to the opening of contact $R_{6-3}$. Contact $R_{4-3}$ will then be opened to de-energize and close (sensor lowering) solenoid valve 19. Air will then be vented from upper compartment 57 via vent $V_1$ on valve 19 and sensor 3 will be retracted into probe 1 while probe 1 is being withdrawn from vessel 9.

If for any reason, all of the contacts $C_7$, $C_8$ and $C_9$ (FIGS. 1, 4) do not close then, after a maximum period of time set in dwell timer $T_2$, contact $T_{2-1}$ will close. Therefore, relay $R_6$ (FIG. 4) will be energized and the sensor 3 will be retracted into probe 1 while the latter is withdrawn from the vessel 9 in the same manner indicated above.

When the probe 1 (FIG. 1) is being withdrawn from vessel 9, counter 25 counts backward to 0. When counter 25 reaches the zero count, contact $C_5$ on counter 25 (FIGS. 1, 4) opens thereby de-energizing relay $R_2$. As a result, (probe raising) solenoid valve 15 is de-energized and opened, an air supply to motor 7 over supply line 15a is discontinued and withdrawal of the probe 1 ceases.

Also shown in FIG. 4 there are two ganged switches 91, 93 each having two contacts $C_{10}$, $C_{11}$ labelled, respectively, "automatic" and "service." The automatic operation described above occurs with the switches 91, 93 on the automatic contacts $C_{10}$, as shown. However, after recordings have been made and the probe 1 has been withdrawn from the vessel 9, it may be necessary for an operator to remove a used sensor 3 from the probe 1 in order to replace it with a new sensor 3. To do this, the operator merely moves the switches 91, 93 to the service contacts 11. This will energize (sensor raising) solenoid valve 17 and (sensor lowering) solenoid valve 19 thereby causing the sensor 3 to be extended from the probe 1. The operator may then readily substitute a new sensor 3 and retract it into the probe 1 by moving switches 91, 93 back to automatic.

ALTERNATIVE EMBODIMENTS

Figure 5:
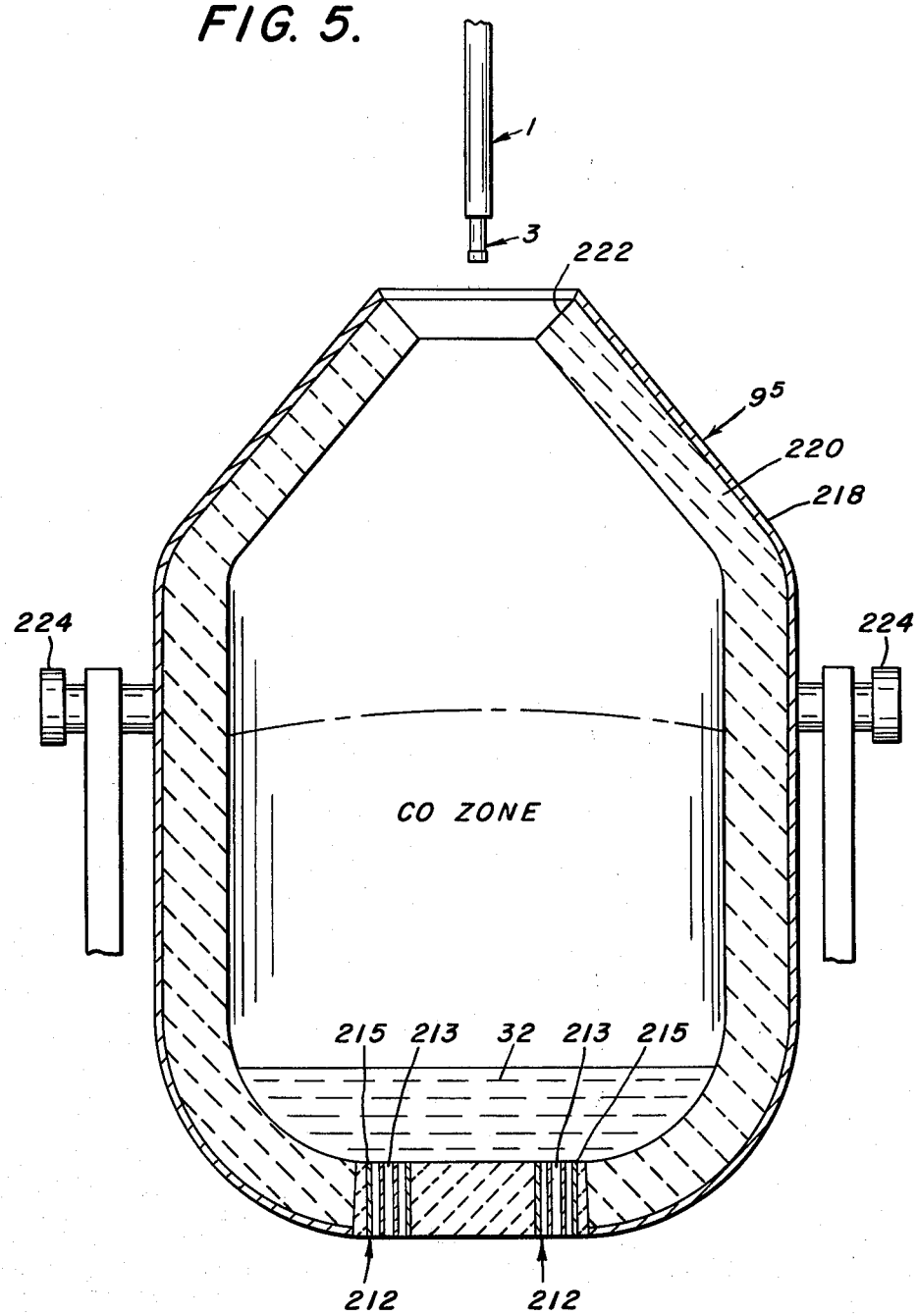
FIGS. 5-9 are vertical sectional views illustrating the use of the apparatus in a bottom blown converter, electric furnace, open hearth furnace, tiltable open hearth, and a hot metal mixer, respectively.

From a consideration of FIG. 5, it will be apparent that the present invention may be employed with a bottom blown converter $9^5$ having bottom submerged tuyeres 212 and a carbon monoxide zone (CO zone) of the converter $9^5$ above the bath 32. This bottom blown converter $9^5$ has a shell 218 provided with a refractory lining 220 and a mouth 222 and is rotatable on trunnions 224. The tuyeres 212 are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215 a shroud gas, such as propane, natural gas, light fuel oil or the like. The probe 1 and sensor 3 reciprocate into and out of the vessel $9^5$ through the mouth 222.

Figure 6:
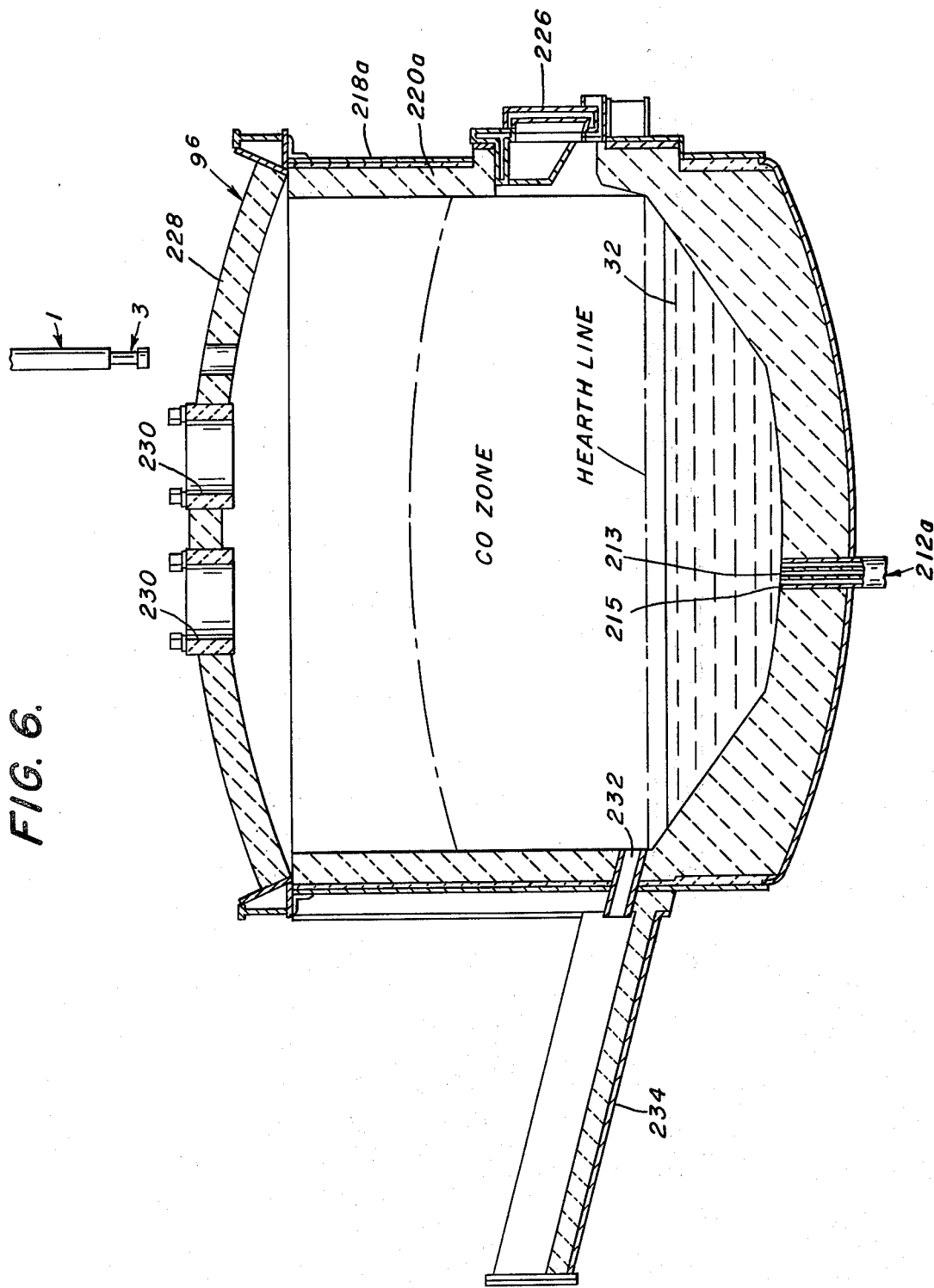

As shown in FIG. 6, the present invention is also applicable to a Heroult Type electric-arc steelmaking furnace $9^6$ provided with a vertical bottom submerged tuyere 212a and a carbon monoxide zone (CO zone) above the bath 32 of the furnace $9^6$. This electric-arc steelmaking furnace $9^6$ has a shell 218a provided with a refractory lining 220a, a side door 226, a refractory roof 228 provided with electrode holes 230, a tap hole 232, and a pouring spout 234 extending from the tap hole 232. The tuyere 212a is adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215, a shroud gas, such as propane, natural gas, light fuel oil or the like. The probe 1 and sensor 3 reciprocate into and out of the furnace $9^6$ through a probe hole 229 in the roof 228.

Figure 7:
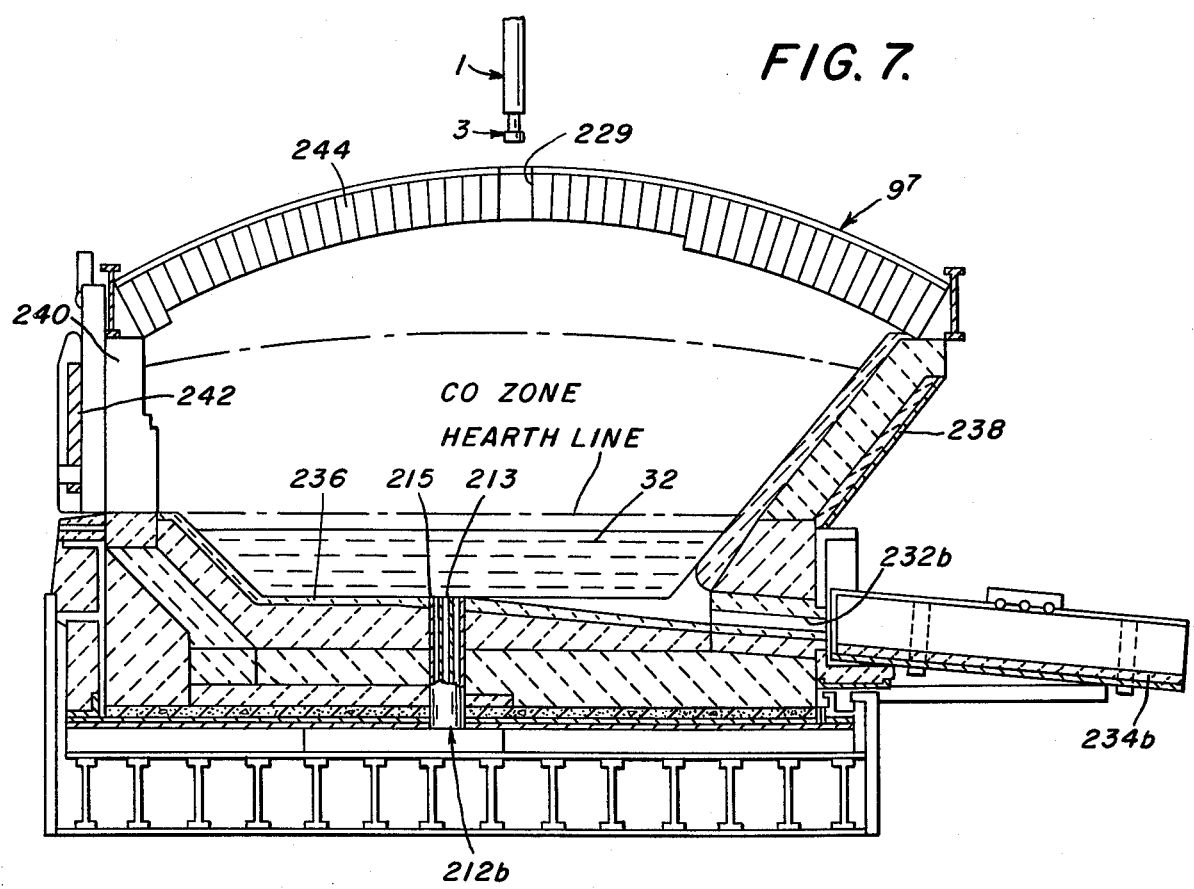

In addition, the present invention may be employed as shown in FIG. 7 with the open hearth furnace $9^7$ having the vertical bottom submerged tuyere 212b and the carbon monoxide zone (CO zone) above the bath 32 of the furnace $9^7$. This open hearth furnace $9^7$ includes a refractory lined bottom 236, a refractory lined sloping back wall 238, a refractory lined front wall 240, a charging door 242 in the wall 240, and a refractory lined roof 244. A tap hole 232b opposite the charging door 242 leads to a pouring spout 234b. The tuyere 212b is adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like) and in an outer pipe 215, a shoud gas, such as propane, natural gas, light fuel oil or the like. The probe 1 and sensor 3 reciprocate into and out of the furnace $9^7$ through hole 229 in roof 244.

Figure 8:
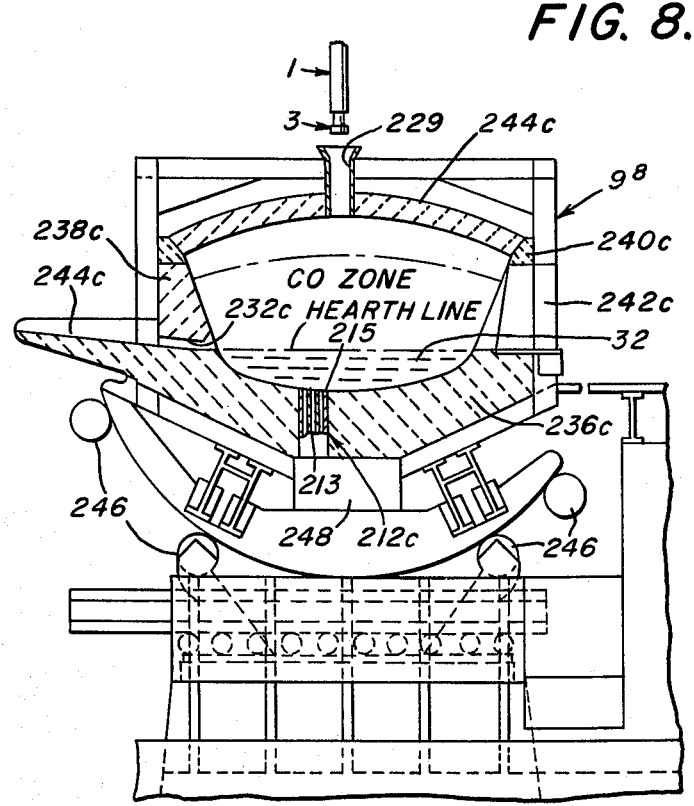

Again as shown in FIG. 8, the present invention may be employed with a tilting open hearth furnace $9^8$ mounted on rollers 246 arranged in a circular path for providing rotation on the longitudinal axis of the furnace $9^8$ for pouring the refined steel in the bath 32 through a tap hole 232c and a pouring spout 234c. As shown in FIG. 8, the tiltable open hearth furnace $9^8$ has a vertical bottom submerged tuyere 212c connected through a blast box 248 to fluid supplies (not shown) and a carbon monoxide zone (CO zone) of the furnace $9^8$. The tiltable open hearth furnace $9^8$ has a refractory lined bottom 236c, refractory lined back wall 238c, refractory lined front wall 240c (provided with a charging door 242c) and a refractory lined roof 244c. The tuyere 212c is adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215, a shroud gas, such as propane, natural gas, light fuel oil or the like. The probe 1 and sensor 3 reciprocate in and out of the furnace $9^8$ through the hole 229 in the roof 244c.

Figure 9:
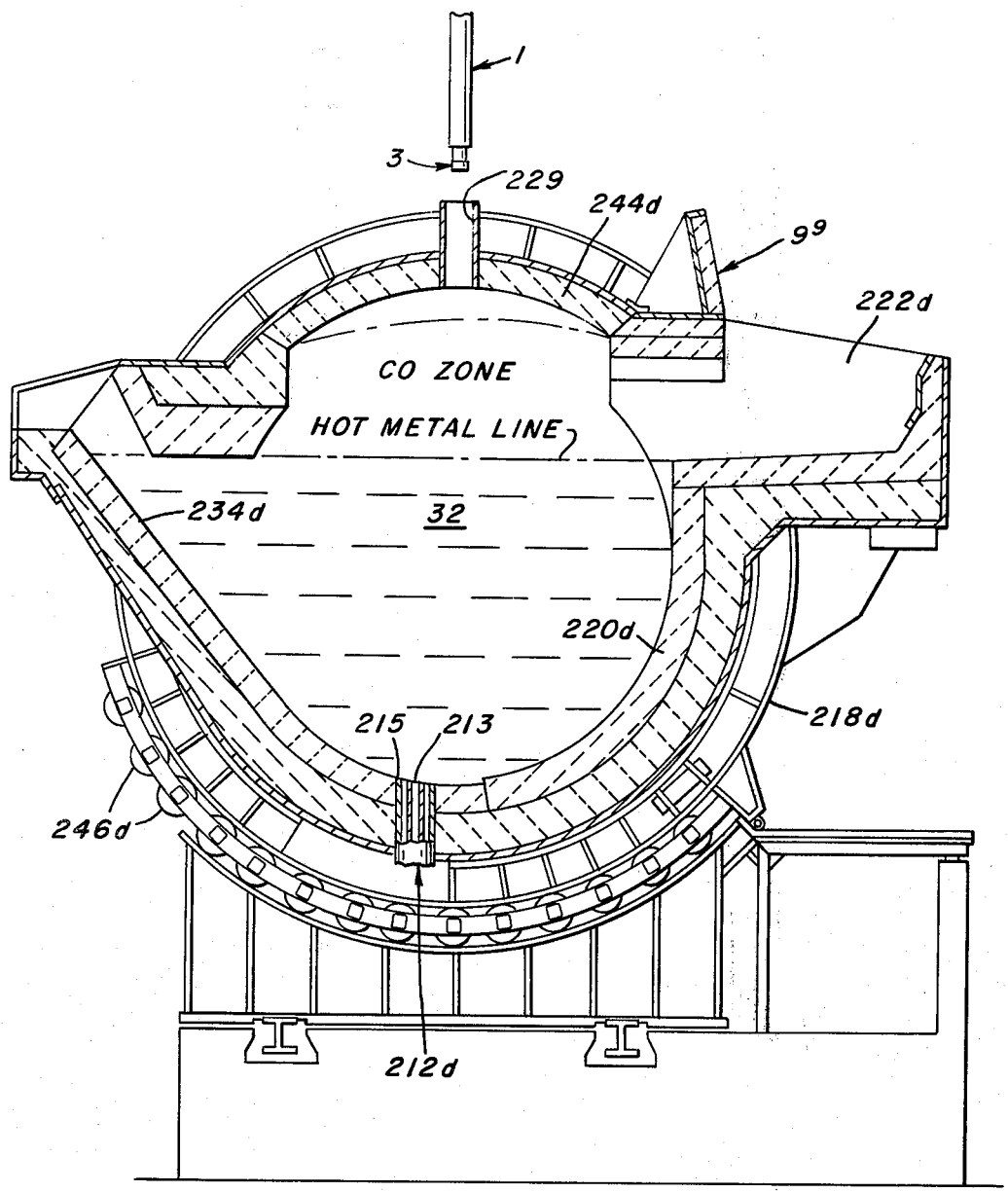

In FIG. 9, the present invention is employed with a hot metal mixer $9^9$ having a shell 218d provided with a refractory lining 220d, and having also an inlet mouth 222d and a pouring spout 234d. The mixer $9^9$ is oscillatable on rollers 246d between the charging and discharging positions. Such mixer $9^9$ has vertical bottom submerged tuyere 212d, and a carbon monoxide zone (CO zone) above the bath 32 of the mixer $9^9$. The tuyere 212d is adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215, a shroud gas, such as propane, natural gas, light fuel oil or the like. The probe 1 and sensor 3 reciprocate in and out of the mixer $9^9$ through hole 229 in the roof 244d.

METHOD

It will be understood from the above description of the apparatus A that an improved method is contemplated by this invention.

This method of automatically sensing and recording parameters of a bath 32 in a vessel 9 includes the steps of:

a. detecting ($C_1$, $C_2$, $C_3$) when good electrical contact has been made between a sensor 3 and a recorder 27, 29, 31;

b. supplying $R_2$, 11) a sensor protecting gas $CO_2$ when good electrical contact is detected;

c. detecting (21, $C_4$) the flow of the sensor protecting gas $CO_2$;

d. lowering (13, 13a) a probe 1 to a predetermined depth $d_1'$ within a vessel 9 when the flow of sensor protecting gas $CO_2$ is detected;

e. extending (19) a sensor 3, housed in the probe 1, to a predetermined depth $d_2$ within a bath 32 in the vessel 9;

f. retracting (17) the sensor 3 into the probe 1 after the occurrence of a predetermined condition; and g. removing (15) the probe 1 from the vessel 9.

Additionally, the method includes the steps:

a. wherein the step of retracting occurs after the good electrical contact 61, 63, 65 is broken or after a maximum duration of time $T_1$, whichever condition occurs first;

b. wherein the step of extending comprises:
 1. commencing the withdrawal of the sensor 3 from the probe 1 after the probe 1 has reached its predetermined depth $d_1'$;
 2. continuing the withdrawal of the sensor 3 from the probe 1 for a predetermined period of time $T_1$; and
 3. stopping the withdrawal at the end of the predetermined period of time $T_1$;

c. wherein the step of lowering comprises:
 1. generating (23) a series of pulses as the probe 1 is being lowered;
 2. counting (25) the number of pulses generated; and
 3. stopping the movement of the probe 1 when a predetermined count is reached; and d. wherein the step of removing comprises:
 1. counting backwards from the predetermined count; and
 2. stopping the removal of the probe 1 from the vessel 9 when a zero count is reached; and e. wherein the step of removing comprises removing the probe 1 from the vessel 9 while the sensor 3 is being retracted into the probe 1.

While in accordance with the patent statutes, a preferred and alternative embodiment of this invention has been illustrated and described in detail, it is to be particularly understood that the invention is not limited thereto or thereby.

What is claimed is:

1. The method of automatically sensing and recording parameters of a bath in a vessel including the steps of:

a. detecting when good electrical contact has been made between a sensor housed in a probe and a recorder;
 b. supplying a sensor protecting gas through said probe and around said sensor when said good electrical contact is detected;
 c. detecting the flow of the sensor protecting gas;
 d. lowering said probe to a predetermined depth within a vessel when said flow of sensor protecting gas is detected;
 e. extending said sensor relative to said probe, to a predetermined depth within a bath in said vessel in order to sense and record the parameters of the bath;
 f. retracting said sensor into said probe after said good electrical contact is broken or after a maximum duration of time, whichever condition occurs first; and
 g. removing said probe from said vessel.

2. The method of claim 1 wherein the step of lowering comprises:

a. generating a series of pulses as the probe is being lowered;
 b. counting the number of pulses generated; and
 c. stopping the movement of the probe when a predetermined count is reached.

3. The method of claim 2 wherein the step of removing comprises:

a. counting backwards from the predetermined count; and
 b. stopping the removal of said probe from the vessel when a zero count is reached.

4. The method of claim 3 wherein the step of removing comprises removing said probe from the vessel while said sensor is being retracted into said probe.

5. For a vessel containing a molten metal bath, apparatus for sensing parameters in the bath and recording said parameters on a recorder, which comprises:

a. a probe;
 b. a sensor housed in said probe and electrically connected to the recorder, said sensor being movable with respect to the probe for transmitting signals to the recorder indicative of said bath parameters;
 c. means for supplying a sensor protecting gas about said sensor;

d. means for detecting the flow of the sensor protecting gas;

e. means for moving the probe to a predetermined depth in said vessel relative to the bath;

f. means for moving the sensor relative to the probe and into said bath a predetermined distance; and g. automatic control means for controlling said probe and sensor moving means, which includes;

selectively openable and closable contact means operable in response to the detection of flow of the sensor protecting gas for enabling said probe moving means to lower the probe to said predetermined depth within the vessel; and means for enabling said sensor moving means to extend said sensor into the bath when the probe has reached the predetermined depth.

6. The apparatus of claim 5 wherein said automatic control means further comprises:

a. means for detecting when good electrical contact has been made between said sensor and the recorder; and b. means responsive to detection of good electrical contact between said sensor and the recorder for supplying said sensor protecting gas about said sensor.

7. The apparatus of claim 5 wherein said automatic control means further includes means for withdrawing said sensor from the bath under predetermined conditions.

8. The apparatus of claim 7 wherein said sensor is withdrawn from the bath after said good electrical contact is broken or after a maximum duration of time, whichever condition occurs first.

9. The apparatus of claim 8 wherein said means for withdrawing includes means for enabling said sensor moving means to retract said sensor into said probe when one of said predetermined conditions has occurred; and said automatic control means further includes means for enabling said probe moving means to withdraw said probe from the vessel.

10. The apparatus of claim 9 wherein said means for enabling said probe to be lowered a predetermined depth comprises a pulse generator responsive to the operation of said probe moving means; a pulse counter, having a pre-set count, which counts pulses generated by said pulse generator; and means for stopping said probe from being lowered when said pre-set count is reached.

11. The apparatus of claim 9 wherein said probe moving means comprises a reversible air motor; and first and second solenoid valve controlled supply lines connected to said motor.

12. The apparatus of claim 9 wherein said sensor moving means comprises an air cylinder, housed within said probe, having a piston, said piston separating said cylinder into first and second compartments; and third and fourth solenoid valve controlled supply lines connected, respectively, to said first and second compartments.

13. The apparatus of claim 9 wherein said means for supplying protecting gas comprises a solenoid valve controlled supply line connected to said probe.

14. The apparatus of claim 9 further including manually operated switch means for extending the sensor from, and retracting it into, said probe.

15. Apparatus for sensing parameters in a vessel containing a molten metal bath and recording said parameters on a recorder which comprises:

a. a probe;

b. a sensor housed in and movable with respect to said probe, and electrically connected to the recorder for sensing the parameters and generating and transmitting to the recorder signals representative thereof;

c. means for supplying a sensor protecting gas about said sensor;

d. means for moving the probe to a predetermined depth in said vessel relative to the bath;

e. means for moving the sensor relative to the probe and into said bath a predetermined distance; and f. automatic control means, including switching means, for 1. detecting when good electrical contact has been made between the sensor and the recorder; then 2. enabling said gas supplying means to begin supplying sensor protecting gas to the sensor; then 3. detecting when the flow of sensor protecting gas has begun; and then 4. enabling said probe moving means and said sensor moving means to move said probe and sensor, respectively, so that said sensor protecting gas cannot be supplied unless the sensor is electrically connected to the recorder, and said probe and sensor cannot be lowered into the vessel until protective gas is supplied thereto.

16. The apparatus of claim 15 which further comprises:

means for withdrawing said sensor from the bath under predetermined conditions; and wherein said automatic control means further includes means for enabling the withdrawal of said sensor from the bath upon the sensing of said predetermined conditions.

17. The apparatus of claim 16 wherein said sensor is withdrawn from the bath after said good electrical contact is broken or after a maximum duration of time, whichever condition occurs first.

18. The apparatus of claim 17 which further comprises, means for retracting said sensor into said probe when one of said predetermined conditions has occurred.

19. The apparatus of claim 18 wherein said means for moving said probe to a predetermined depth comprises: a pulse generator responsive to the operation of said probe moving means; a pulse counter, having a pre-set count, which counts pulses generated by said pulse generator; and means for stopping said probe moving means when said pre-set count is reached.

20. The apparatus of claim 18 wherein said probe moving means comprises a reversible air motor; and first and second solenoid valve controlled supply lines connected to said motor.

21. The apparatus of claim 18 wherein said sensor moving retracting means comprises an air cylinder, housed within said probe, having a piston, said piston separating said cylinder into first and second compartments; and third and fourth solenoid valve controlled supply lines connected, respectively, to said first and second compartments.

22. The apparatus of claim 18 wherein said means for supplying protecting gas comprises a solenoid valve controlled supply line connected to said probe.

23. The apparatus of claim 18 further including manually operated switch means for extending the sensor from, and retracting it into, said probe.

24. The combination of claim 15 wherein said vessel is a basic oxygen converter.

25. The combination of claim 15 wherein said vessel is a Q-BOP converter.

26. The combination of claim 15 wherein said vessel is an electric furnace.

27. The combination of claim 15 wherein said vessel is an open hearth furnace.

28. The combination of claim 15 wherein said vessel is a tilting open hearth furnace.

29. The combination of claim 15 wherein said vessel is a hot metal mixer.

* * * * *